United States Patent [19]

Pietro

[11] Patent Number: 4,911,573

[45] Date of Patent: Mar. 27, 1990

[54] RIGID AXIAL RETAINER

[75] Inventor: Bordoni Pietro, Modena, Italy

[73] Assignee: Nuova Omec S.r.l., Bologna, Italy

[21] Appl. No.: 285,766

[22] Filed: Dec. 16, 1988

[30] Foreign Application Priority Data

Dec. 24, 1987 [IT] Italy ............................... 5022/87[U]
Jan. 26, 1988 [IT] Italy ............................... 4717/88[U]

[51] Int. Cl.⁴ .............................................. B25G 3/16
[52] U.S. Cl. ................................... 403/349; 403/343; 285/361
[58] Field of Search ............... 403/349, 343; 285/361, 285/396, 402

[56] References Cited

U.S. PATENT DOCUMENTS

| 221,442 | 11/1879 | Broome ............................. 285/396 |
| 305,140 | 9/1884 | Bradley ............................. 285/396 |
| 363,122 | 5/1887 | Dimick ............................. 285/402 |
| 1,932,099 | 10/1933 | Cabana ........................... 403/349 X |

FOREIGN PATENT DOCUMENTS 838157  6/1960  United Kingdom ............... 285/396

Primary Examiner—Andrew V. Kundrat
Attorney, Agent, or Firm—Cohen, Pontani & Lieberman

[57] ABSTRACT

The object of the present invention is to provide a rigid axial retainer for use in bayonet joints. The rigid axial retainer is particularly useful for connecting lengths of tube to form handles for brooms, cleaning equipment and the like. The retainer has a female portion with at least one transverse protrusion and a male portion with at least one substantially "L-shaped" groove. The groove provided on the male portion has a first part which axially aligns with the transverse protrusion within the female portion when the male portion and the female portion are moved longitudinally with respect to each other. The first part of the groove debouches into a transverse second part of decreasing depth having an inclination identical to that of said transversally protruding sement. Following longitudinal movement of the male portion with respect to the female portion until the transverse protrusion reaches the end of the first part of the groove, the male portion is rotated with respect to the female portion so that the transverse protrusion is seated within the second part of the groove.

7 Claims, 2 Drawing Sheets

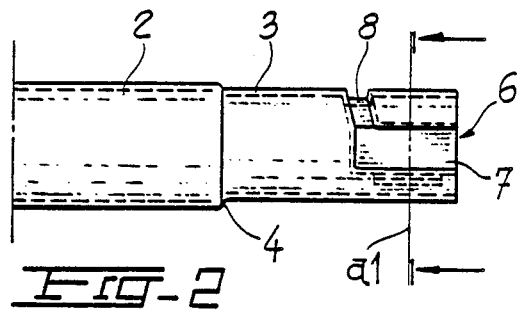 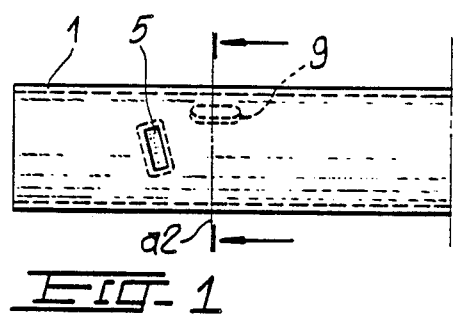
Fig. 2  Fig. 1
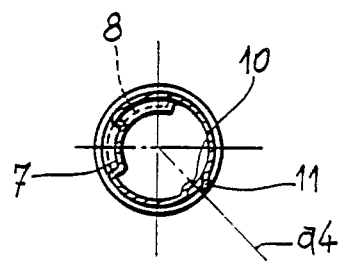 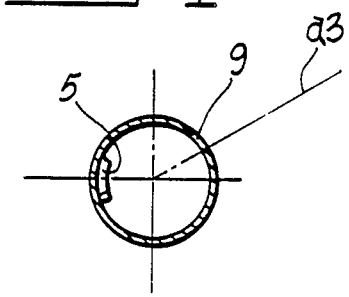
Fig. 4  Fig. 3
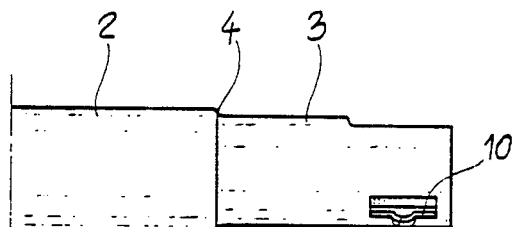 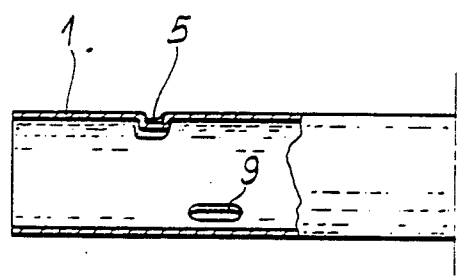
Fig. 6  Fig. 5
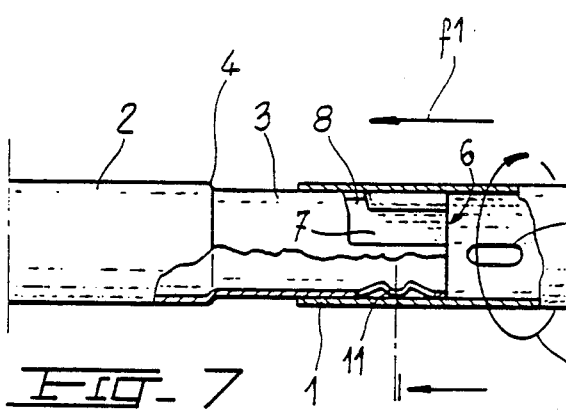 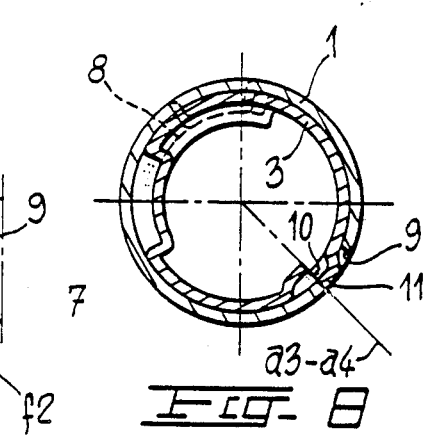
Fig. 7  Fig. 8

RIGID AXIAL RETAINER

BACKGROUND OF THE INVENTION

This invention relates generally to bayonet joints of the type wherein a male portion is retained within a female portion and in particular, to a rigid axial retainer for use in retaining the male portion within the female portion.

It is well known that most modern handles for brooms, similar cleaning equipment and the like are made of lightweight metallic tubing. Such handles are often covered with plastic and are widely distributed.

These handles commonly include a plurality of sections which can be combined with each other in order to vary the length of the handle and permit the length of the handle to be changed for each specific need or use to which the handle is to be put. The ability to vary the length of the handle also facilitates packing, storing and transportation of both the handle and the equipment with which the handle is to be used.

The system of connecting sections of handles together and of connecting the handles to an attachment such as a broom or other cleaning device is normally based on so-called "bayonet joints". As used herein, the term "bayonet joints" refers to joints which include a "male" length or member with a suitably tapered end which is adapted to be inserted into a "female" length or member. In order to connect a series of male and female lengths, each length has one tapered end which functions as a male end and one untapered end which functions as a female end. The lengths can then be connected one after the other by alternately fitting male ends into female ends to achieve any desired overall length.

There are many systems for securing the male and female lengths so that the bayonet joints do not become undone during use. In general, means are provided for securing the lengths in a longitudinal direction, hereinafter referred to as the "axial" direction.

In one embodiment, the taper of the male length is provided with a thread which can be screwed into a corresponding internal thread in the female length. The threads are produced by rolling the lengths directly on a thread-forming plate. It is necessary for the threads to be tight in order to impart rigidity to the joint. The difficulty with constructions of this embodiment is that the firmness of the thread spiral decreases after repeated threading and unthreading of the male length in and out of the female length. The decreased firmness that develops tends to pull the male length out of the female length and cause the male length to act against the female length with a wedge action. This in turn causes the edges to be deformed to such an extent that it is no longer possible to tighten the threads properly, and the joint loses rigidity.

In another similar embodiment, the threads of the male length and the female length are provided on separate attachments which are then separately secured to each of the male and female lengths. However, this alternative necessarily increases the weight and the cost of the system.

In still another embodiment, the male length is provided with a circumferential hole. A rounded pin slides radially through the hole against the action of an opposing spring provided within the male length. During engagement of the male length with the female length, the pin retracts within the taper of the male part. Following engagement, the pin is pushed by the spring and extends through the circumferential hole in the male part and a corresponding hole arranged radially on the female part, thereby axially locking the joint. This system does not, however, avoid the drawbacks associated with radial or transverse play of the joint.

In order to eliminate the widespread drawbacks associated with lack of rigidity in units connected by the devices provided in accordance with the known art summarized above, the device disclosed and claimed in European patent application No. 84 83 0295.6, was created. This device has a cylindrical expansion ring on the male part. The ring expands when introduced into the female part by axially striking against a stop provided in front of the male piece under the action of a threaded conical frustum, which then penetrates into the ring itself. The expansion ring is further provided with a longitudinal slit in order to favor homogeneous deformation of the ring. This device provides excellent axial holding characteristics to bayonet joints in which it is used and does so without permitting any transverse or radial play. Consequently, optimum rigidity is provided. The corresponding unit using this device in a bayonet joint is, however, generally too expensive to permit use in brooms, cleaning equipment and the like.

SUMMARY OF THE INVENTION

An object of the invention is to provide a device for axially connecting bayonet joints with optimum radial or transverse rigidity namely, without play, at minimal expense.

Another object of the present invention is to provide a rigid axial retaining device which cannot be unscrewed accidentally.

The objects of the invention can be achieved by providing an inexpensive, transversely rigid axial retaining device for use in bayonet joints particularly, for use in bayonet joints connecting lengths of tube to form handles for brooms, similar cleaning appliances and the like, in accordance with the present invention. The device has a female portion with at least one segment protruding transversely therewithin and a substantially "L-shaped" groove provided on the male portion for interacting with the transverse protrusion. The groove is shaped with a first axially extending part which is contiguous with a second transversely extending part of decreasing depth. The second transversely extending part has an inclination identical to that of the transversely protruding segment in the female portion.

Further features and advantages of the device of the present invention will become apparent from the following detailed description of a preferred but not exclusive embodiment.

BRIEF DESCRIPTION OF THE DRAWINGS

The invention will be better understood by way of illustration and not of limitation with reference to the accompanying drawings, in which:

FIG. 1 is a plan view of a female length of a handle constructed and arranged in accordance with the present invention;

FIG. 2 is a plan view of a male length of a handle constructed and arranged in accordance with the invention;

FIG. 3 is a cross-sectional view of a female length of a handle taken through section line 3—3 of FIG. 1;

FIG. 4 is a cross-sectional view of the male length of a handle taken through section line 4—4 of FIG. 2;

FIG. 5 is a plan view of a female length of a handle as shown in FIG. 1 with the length being rotated along its longitudinal axis;

FIG. 6 is a plan view of a male length of a handle as shown in FIG. 2 with the length being rotated along its longitudinal axis;

FIG. 7 is a cross-sectional view of a handle having joined male and female lengths constructed and arranged in accordance with the invention;

FIG. 8 is a cross-sectional view of the handle of FIG. 7 taken through section line 8—8 of FIG. 7;

DETAILED DESCRIPTION OF THE PREFERRED EMBODIMENTS

Figure 9:
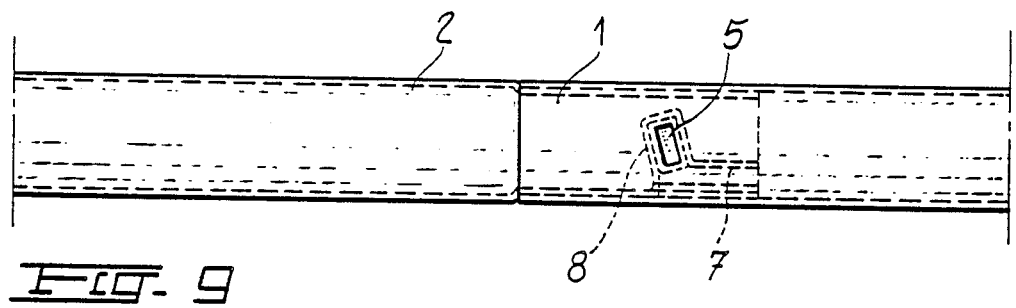
FIG. 9 is a plan view of a handle having joined male and female lengths constructed and arranged in accordance with the invention.
Figure 10:
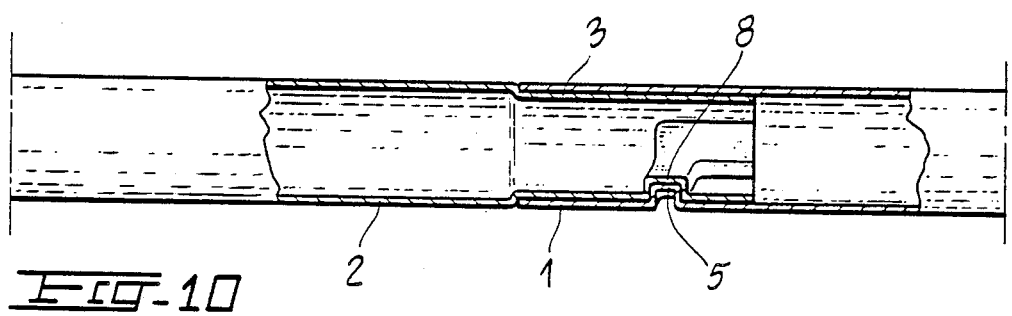
FIG. 10 is a plan view of a handle having joined male and female lengths constructed and arranged in accordance with the invention interengaged as shown in FIG. 9 with the handle being rotated about its longitudinal axis.

Referring to the drawings and in particular, to FIGS. 1 and 2, the end section of a female length 1 of a tube used to form a bayonet joint is shown coaxially facing the end of a complementary male length 2 of a tube used to complete the bayonet joint. Male length 2 includes a tapered portion 3 which is connected to a main body portion 13 of tube 2 along a circular shoulder 4.

Female length 1 includes a transverse protrusion 5 extending therewithin. Transverse protrusion 5 is developed by drawing a recess from the walls of female length 1 and appears as a recess when the tube is viewed from the outside. Transverse protrusion 5 is preferably of a rectangular shape and is arranged with its longer sides inclined transversely with respect to the axis of female length 1.

A groove 6 is provided on the male length 2 using a similar drawing technique. Groove 6 is substantially "L-shaped" and includes an initial part 7 developed in the axial direction of the joint and having a depth and width appropriate to contain the transverse protrusion 5 extending within female length 1. Groove 6 then includes a contiguous second part 8 having a transverse inclination identical to that of protruding segment 5. The width of contiguous second part 8 is suitable for containing transverse protrusion 5 and a depth initially equal to that of first part 7 of groove 6, but decreasing gradually.

In an especially preferred embodiment, shown particularly in FIGS. 5 and 6, a hole 9 is also provided on female portion 1. Hole 9 is preferably developed longitudinally although it will be apparent that it can be developed in any direction and in fact, could be circular in shape. Hole 9 is produced by cutting and removing a section of material constituting female length 1.

A corresponding prominence 11 is provided on tapered portion 3 of male length 2 as shown in particular in FIG. 6. Prominence 11 is formed from a cut segment 10 of tapered portion 3. The radial front end of cut section 10 is flanged and curved towards the outside of tapered portion 3 to form prominence 11. The radial back end of cut segment 10 is flanged and curved towards the inside of tapered portion 3.

To use the bayonet joints constructed and arranged in accordance with the invention, female portion 1 and male portion 2 are positioned coaxially facing each other as shown in FIGS. 1 and 2 and also in FIGS. 5 and 6. The positioning must be such that internally transversely protruding segment 5 of female portion 1 faces initial part 7 of groove 6 provided in tapered end 3 of male portion 2. Female length 1 and male length 2 are moved longitudinally towards each other so that tapered end 3 of male portion 2 slides into the interior of female length 1. As this occurs, transverse protrusion 5 will enter first part 7 of groove 6. Movement of female length 1 towards male length 2 will be stopped when transverse protrusion 5 reaches back wall 12 of first part 7 of groove 6. Female length 1 is then rotated around its longitudinal axis so that it moves relative to male length 2 in such a way that transverse protrusion 5 becomes positioned in contiguous second part 8 of groove 6. This screwing action axially locks the bayonet joint preventing movement of female length 1 with respect to male length 2. Additionally, since the depth of contiguous second part 8 decreases as described above, protruding segment 5 is forced to fit and be blocked within hollow 8. This further imparts rigidity to the bayonet joint and prevents radial or transverse play.

The characteristic rigidity which results from the construction provided in accordance with the invention does not decrease even after prolonged use, as occurs in prior art devices, since protruding segment 5 is locked within cavity 8 by a squeezing action caused by the decreasing depth of cavity 8. Furthermore, the hole within female length 1 is not deformed against circular shoulder 4 where taper 3 joins main body portion 13 of male length 2 since the precise positions of female length 1 with respect to male length 2 are always precisely defined by the position of protrusion 5 within second part 8 of groove 6.

It will also be understood that more than one transverse protrusion 5 can be provided within female length 1. The number of transverse protrusions provided is not significant so long as corresponding substantially "L-shaped" grooves are provided on the tapered portion of the male length for each transverse protrusion.

When the especially preferred embodiment having a prominence 11 on tapered end 3 and a corresponding hole 9 on female length 1 is used, prominence 11 is elastically compressed during insertion of tapered end 3 into female length 1. This occurs as a result of the inherent elasticity of the tube material. The elasticity results from the introduction of cut segment 10 in tapered end 3.

The reciprocal positioning of the hole 9 and the prominence 11 in both the longitudinal and radial directions is such that when protrusion 5 is locked in section 8 of groove 6, the hole 9 comes into position over prominence 11. This permits prominence 11 to extend elastically outward through hole 9 so as to be a further safeguard against radial or longitudinal movement of female length 1 with respect to male length 2.

As can be seen from the foregoing detailed description of the preferred embodiments, the retaining device for bayonet joints constructed and arranged in accordance with the invention offers the advantages corresponding to the attainment of the objects set forth hereinabove. Specifically, the device provides a strong means for axially connecting handle forming tubes for cleaning equipment such as brooms or the like and assures the rigidity of the handle. Transverse or radial play is prevented even after prolonged use of the device and disengagement of the female length from the male length is also prevented. These objects are further achieved at minimal cost since there are no external attachments of parts or materials to either of the male or female lengths. Rather, the parts needed to construct and arrange the device in accordance with the invention are provided by means of simple and inexpensive operations of drawing, cutting and folding.

It is also to be understood that the following claims are intended to cover all of the generic and specific features of the invention herein described and all statements of the scope of the invention which, as a matter of language, might be said to fall therebetween.

What is claimed is:

1. An axial retaining device comprising:
   a female member having a longitudinal axis, a peripheral wall, and a protrusion projecting radially inwardly from the wall, the protrusion having an elongation oriented substantially transverse to the longitudinal axis and substantially perpendicular to the radial inward projection; and
   a male member having a tapered end provided for entry into the female member and having at least one substantially "L-shaped" groove with an initial part adjacent the end of the male member which enters the female member and a transverse contiguous second part, said groove being capable of alignment with the at least one protrusion within the female member whereby the male member and the female member can be joined together by aligning the at least one substantially L-shaped groove with the at least one protrusion, moving the male member into the female member while the groove and protrusion are in alignment, and rotating the male member with respect to the female member so that the protrusion becomes positioned in the transverse second part of the substantially "L-shaped" groove.

2. The retaining device of claim 1, wherein the at least one protrusion is produced by drawing.

3. The retaining device of claim 1, wherein the substantially "L-shaped" groove is formed by drawing.

4. The retaining device of claim 1, wherein the female member further includes a hole and the male member further includes a prominence such that the prominence on the male members extends through the hole in the female member when the male and female members are joined.

5. The retaining device of claim 4, wherein the hole through the female member extends longitudinally.

6. The retaining device of claim 4, wherein the hole through the female member is provided by cutting a section of the female member.

7. The retaining device of claim 4, wherein the prominence is formed by cutting a section of the tapered end of the male member and outwardly flanging the edge of the cut section.

* * * * *